H. P. CLAUSEN.
TESTING ARRANGEMENT.
APPLICATION FILED JULY 24, 1916.
1,220,607.
Patented Mar. 27, 1917.
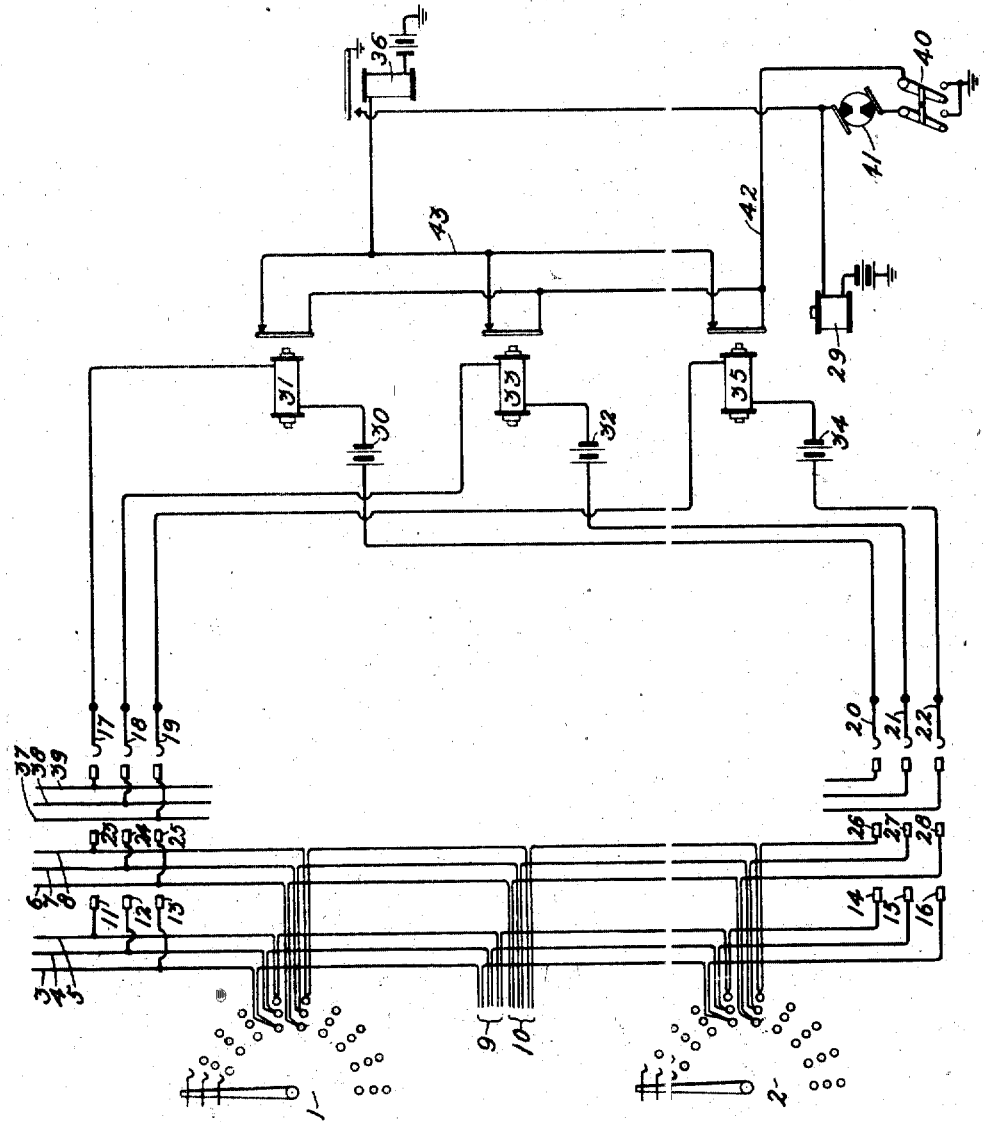
Inventor:
Henry P. Clausen.
by (signature), Att'y

UNITED STATES PATENT OFFICE.

HENRY P. CLAUSEN, OF MOUNT VERNON, NEW YORK, ASSIGNOR TO WESTERN ELECTRIC COMPANY, INCORPORATED, OF NEW YORK, N. Y., A CORPORATION OF NEW YORK.

TESTING ARRANGEMENT.

1,220,607.      Specification of Letters Patent.      Patented Mar. 27, 1917.

Application filed July 24, 1916. Serial No. 110,968.

*To all whom it may concern:*

Be it known that I, HENRY P. CLAUSEN, a citizen of the United States, residing at Mount Vernon, in the county of Westchester and State of New York, have invented certain new and useful Improvements in Testing Arrangements, of which the following is a full, clear, concise, and exact description.

This invention relates to a testing arrangement for performing routine tests in telephone exchange systems. More specifically the invention relates to a testing arrangement for locating open circuits in multiple connections between telephone apparatus, such open circuits constituting an unstandard condition.

By the term "unstandard condition" is meant a condition which does not exist in the standard operation of the system or apparatus under test. Such term is commonly used by workers in the art, including conditions variously referred to as "cases of trouble", "abnormal conditions" or "faults".

It has previously been the practice in telephone exchange systems, for an attendant to periodically test the multiple connections either between jacks in an ordinary manual switchboard, or between switch banks in automatic exchange systems, in order to ascertain if such multiple connections are intact. It has been the practice of such attendant to connect testing instruments to various parts of the multiple connections and to deduce from the operation of such testing instruments whether or not such multiple connections were intact. In accordance with the present invention, however, an arrangement is provided in which the constant service of the attendant is not required, an automatic switch being employed for the purpose of successively connecting testing devices with various multiple connections, which testing devices are adapted to operate when an unstandard condition in such multiple connections is found, and to cause the operation of a recording device, which serves to indicate and record the particular multiple connection in which the unstandard condition has been found to exist. As the multiple connections are usually arranged in groups or sets in accordance with the present invention, as many testing devices are provided as there are multiple connections in a set, all of which testing devices are adapted to be simultaneously associated with a set of multiple connections whereby it is possible to test such multiple connections in sets.

The invention will best be understood by reference to the accompanying drawing, in which the figure shows diagrammatically a plurality of switch contact banks having multiple connections extending therebetween and a testing arrangement for testing for unstandard conditions in such multiple connections.

Two automatic switches are indicated at 1 and 2, the stationary contacts of which are connected together in multiple by means of multiple connections indicated at 3, 4, 5, 6, 7 and 8. Although only two such switches are shown, it will be understood that a large number of such switches may have their contacts connected together by multiple connections as shown; for example, loops for the multiple connections 3, 4, 5 are indicated at 9 and loops for the multiple connections 6, 7, 8 are indicated at 10, which loops may be connected to contacts of an additional switch in the same manner as the contacts of the switches 1 and 2 are connected to such multiple connections. At one end of the multiple connections 3, 4, 5 are connected the contacts 11, 12 and 13, and at the other end are connected the contacts 14, 15 and 16, which contacts form a part of the contact bank of an automatic switch of known construction, in which movable brushes indicated at 17, 18, 19, 20, 21 and 22 are adapted to be moved over the contacts 11 to 16 inclusive, and similar contacts to other multiple connections. The contacts associated with the set of multiple connections 6, 7, 8 are indicated at 23, 24, 25, 26, 27 and 28. The brushes 17 to 22 are mounted upon a single brush carriage which may be stepped from one row of contacts to the next in response to the intermittent energization of the stepping magnet indicated at 29. Switches of this character are well known and the brushes thereof may either be moved longitudinally along a flat bank or panel of contacts, or may be moved in a circular direction over a cylindrical bank of contacts, both constructions being well known. The brushes 17 and 20 are connected at either end of the circuit, including a battery 30, a test relay 31, which test relay as shown is of the slow release type; similarly, the brushes 18 and 21 are connected at either end of a circuit including a source of potential 32; also the brushes 17 to 22 are connected at either end of a circuit including a source of potential 34 and a test relay 35. The test relays 33 and 35 are also of the slow release type. A recording magnet controlled by such test relays is indicated at 36.

The operation of the arrangement will now be described, it being assumed that the contact brushes 17 to 22 of the testing switch are resting upon the contacts associated with the multiple connections indicated at 37 to 39, having completed the test thereof. It will also be assumed that no open circuit exists in the set of multiple connections indicated at 6, 7, 8 and that an open circuit, and hence an unstandard condition exists in the connection 4 of the set of multiple connections indicated at 3, 4, 5. The arrangement is started in operation by the throwing of the manual switch 40. After such switch is once thrown, the testing and recording operation of the arrangement takes place entirely automatically.

As soon as the switch 40 is thrown and the conducting segments of the interrupter 41 make contact with the interrupter brushes, a circuit is closed from battery through the stepping magnet 29, interrupter 41, left-hand arm of the manual switch 40 to ground. Stepping magnet 29 is energized in this circuit, and steps the brushes 17 to 22 into contact with the row of contacts 23 to 28. As soon as the brushes 17 to 22 make contact with the row of contacts 23 to 28, there being no open circuits in the case assumed in the set of connections 6, 7 and 8, a circuit will be closed for the test relay 31 from battery to the relay 31, brush 17, contact 23, connection 8, contact 26, brush 20, back to the other side of the battery. A similar circuit will be closed for the test relay 33 from battery 32, test relay 33, brush 18, contact 24, connector 7, contact 27, brush 21 to the other side of battery 32. A circuit will also be closed for the relay 35 from battery, through the relay 35, brush 19, contact 25, connector 6, contact 28, brush 22, to the other side of the battery. All three of the test relays will be energized under these conditions, as no unstandard condition exists, hence there will be no energizing circuit for the recorder magnet 36, as the energizing circuit for such magnet is open at the back contact of the test relays. When the conducting segments of the interrupter again bridge the interrupter brushes, a circuit will be established for the stepping magnet 29, and the brushes 17 to 22 will be advanced into contact with the row of contacts 11 to 16. As the relays 31 to 33 and 35 are slow release relays, the armatures thereof will not be released while brushes 17 to 22 are passing between the rows of contacts. It being assumed that there is an unstandard condition in connector 4, as soon as the brushes 17 to 22 reach contact with the contacts 11 to 16, there will be no circuit for maintaining the test relay 33 energized. The relays 31 and 35, however, will hold up, as their circuits will be completed over the conductors 3 and 5, which are in the standard condition. When the relay 33 releases its armature, indicating an unstandard condition, a circuit is closed for the recorder magnet 36 from battery, through such recorder magnet, conductor 43, back contact and armature of relay 33, conductor 42, right arm of switch 40 to ground.

The recorder magnet 36 will operate and will cause suitable recording mechanism to make a record of the existence of an unstandard condition. From a subsequent inspection of the record thus made, an attendant can determine in which of the multiple connections the unstandard condition exists and can thereupon remedy such unstandard condition. As soon as the conducting segments of the interrupter again bridge the brushes thereof, an energizing circuit is closed for the stepping magnet 29 and the brushes 17 to 22 are advanced to the next set of contacts and the testing operation as above described is repeated.

It will be observed that in the arrangement described, if only standard conditions exist in the multiple connections, the test relays 31 to 35 will remain energized as the switch brushes are moved from one set of the contacts to the other and the recorder magnet therefore will only be energized to record an unstandard condition when one or more of such relays releases its armature.

What is claimed is:

1. An arrangement for testing for unstandard conditions in the multiple of a telephone exchange system, comprising a testing device adapted to operate differently in response to electrical conditions indicating standard and unstandard conditions, multiple connections, contacts associated with each end of such multiple connections, and automatic means for connecting such testing device with such contacts.

2. An arrangement for testing for unstandard conditions in the multiple of a telephone exchange system, comprising a testing device adapted to operate differently in response to electrical conditions indicating standard and unstandard conditions, sets of multiple connections, sets of contacts associated with such sets of multiple connections, and automatic means for successively connecting said testing device with such sets of contacts.

3. An arrangement for testing for unstandard conditions in the multiple of a telephone exchange system, comprising a plurality of multiple connections, contacts connected to each end of such multiple connections, a pair of brushes adapted to make contact with such contacts, a testing device associated with such brushes, and means for automatically bringing such brushes into operative relation with such contacts.

4. An arrangement for testing for unstandard conditions in the multiple of a telephone exchange system, comprising a test relay and a circuit for such test relay, including a multiple connection, and means controlled by the deënergization of such test relay for recording an unstandard condition.

In witness whereof, I hereunto subscribe my name this 20th day of July A. D., 1916.

HENRY P. CLAUSEN.